US011852217B2

(12) United States Patent
Nakamura et al.

(10) Patent No.: US 11,852,217 B2
(45) Date of Patent: Dec. 26, 2023

(54) SPEED REDUCER AND DRIVE DEVICE USING THE SAME

(71) Applicant: Nabtesco Corporation, Tokyo (JP)

(72) Inventors: Koji Nakamura, Tokyo (JP); Yuta Nagaya, Tokyo (JP)

(73) Assignee: NABTESCO CORPORATION, Tokyo (JP)

(*) Notice: Subject to any disclaimer, the term of this patent is extended or adjusted under 35 U.S.C. 154(b) by 0 days.

(21) Appl. No.: 17/442,070

(22) PCT Filed: Mar. 25, 2020

(86) PCT No.: PCT/JP2020/013447
§ 371 (c)(1),
(2) Date: Sep. 22, 2021

(87) PCT Pub. No.: WO2020/217834
PCT Pub. Date: Oct. 29, 2020

(65) Prior Publication Data
US 2022/0170532 A1    Jun. 2, 2022

(30) Foreign Application Priority Data

Apr. 26, 2019   (JP) .................................. 2019-086559

(51) Int. Cl.
*F16H 1/32*     (2006.01)
*F16H 57/023*   (2012.01)
*F16H 57/02*    (2012.01)

(52) U.S. Cl.
CPC ............ *F16H 1/32* (2013.01); *F16H 57/023* (2013.01); *F16H 2001/323* (2013.01); *F16H 2057/02086* (2013.01)

(58) Field of Classification Search
CPC ..................... F16H 1/32; F16H 57/023; F16H 2057/02086; F16H 2001/323
See application file for complete search history.

(56) References Cited

U.S. PATENT DOCUMENTS 7,942,779 B2 *   5/2011  Kobayashi ........... B25J 19/0029
                                             475/149
2001/0012809 A1   8/2001  Fujimoto
(Continued)

FOREIGN PATENT DOCUMENTS

EP   2149724 A1 *  2/2010  ............... F16H 1/32
EP   2261531 A1 * 12/2010  ............... F16H 1/32
(Continued)

OTHER PUBLICATIONS

International Search Report dated Jun. 23, 2020, issued in corresponding International Patent Application No. PCT/JP2020/013447 with English translation (4 pgs.).
(Continued)

*Primary Examiner* — Sherry L Estremsky
(74) *Attorney, Agent, or Firm* — Pillsbury Winthrop Shaw Pittman, LLP

(57) ABSTRACT

A speed reducer according to the invention includes: a main speed reduction unit decelerating rotation from an input side and transmitting decelerated rotation to an output side; a fixed block coupled to the main speed reduction unit and rotatably supporting an input gear coupled to a rotary drive source; an output gear transmitting rotation of the input gear to an input side of the main speed reduction unit; and an intermediate gear meshing with the input gear and the output gear and rotatably supported by the fixed block.

12 Claims, 5 Drawing Sheets

(56) References Cited

U.S. PATENT DOCUMENTS

| | | | | |
|---|---|---|---|---|
| 2008/0295623 A1* | 12/2008 | Kurita | ....................... | F16H 1/32 |
| | | | | 74/25 |
| 2009/0019961 A1 | 1/2009 | Kobayashi | | |
| 2009/0325753 A1* | 12/2009 | Hirata | ....................... | F16H 1/32 |
| | | | | 475/162 |
| 2011/0132433 A1 | 6/2011 | Tanaka et al. | | |
| 2011/0275469 A1 | 11/2011 | Miyoshi et al. | | |

FOREIGN PATENT DOCUMENTS

| | | | | | |
|---|---|---|---|---|---|
| EP | 2327906 B1 | * | 6/2013 | ............... | F16H 1/32 |
| JP | 7-124883 A | | 5/1995 | | |
| JP | 2010-159851 A | | 7/2010 | | |
| JP | 5231530 B2 | | 7/2013 | | |
| JP | 2016-200263 A | | 12/2016 | | |
| KR | 20080096798 A | * | 11/2008 | | |
| WO | 2006/115257 A1 | | 11/2006 | | |
| WO | 2009/119737 A1 | | 10/2009 | | |

OTHER PUBLICATIONS

Extended European Search Report dated Mar. 15, 2023, issued in corresponding European Patent Application No. 20795537.8 (7 pgs.).

Decision of Rejection dated Aug. 8, 2023, issued in corresponding Japanese Patent Application No. 2019-086559 with English translation (8 pgs.).

* cited by examiner

//  SPEED REDUCER AND DRIVE DEVICE USING THE SAME

CROSS-REFERENCE TO RELATED APPLICATIONS

This Application is the U.S. National Stage of PCT/JP2020/013447, filed Mar. 25, 2020, which claims priority to Japanese Patent Application No. 2019-086559 filed Apr. 26, 2019. The contents of each of which is incorporated herein by reference in its entirety.

TECHNICAL FIELD

The present invention relates to a reducer and a drive device using the speed reducer.

BACKGROUND

Industrial robots, machine tools and the like may include a speed reducer to reduce the speed of rotation of a rotary drive source such as a motor (see, for example, Patent Literature 1).

The speed reducer described in Patent Literature 1 has a main speed reduction unit that reduces a speed of rotation of an input side and transmits the rotation to an output side, and an upstream gear mechanism that reduces a speed of rotation of a rotary drive source such as a motor and transmits the rotation to the main speed reduction unit.

The main speed reduction unit includes an outer cylinder block having a substantially circular cylindrical shape, a carrier block rotatably supported by the outer cylinder block, an input rotor (eccentric shaft) rotatably supported at a position radially offset from the rotation center of the carrier block, and a main speed reduction mechanism that reduces rotation of the input rotor and transmits the rotation to the carrier block. The outer cylinder block is fixed to an installation site such as a floor surface, and the carrier block is coupled to a rotary block such as a turntable.

The main speed reduction mechanism includes a plurality of internal tooth pins on an inner circumference of the outer cylinder block and a pivot gear that pivots and revolves in the inside of the outer cylinder block. The pivot gear has a smaller number of external teeth than the number of internal tooth pins, and the external teeth are configured to engage with the plurality of internal tooth pins. When the pivot gear rotates in engagement with the plurality of internal tooth pins, it revolves relative to the outer cylinder block by a predetermined pitch per single rotation. The input rotor supported by the carrier block has a driven gear that receives an external rotational force and a crank-shaped eccentric portion. The eccentric portion is pivotally engaged with the pivot gear such that it rotates in phase with the pivot gear. The rotation of the input rotor rotates the pivot gear pivotally, and the revolving movement of the pivot gear is reduced at a predetermined reduction ratio while the external teeth of the pivot gear engage the internal tooth pins. As a result, the carrier block rotates at the same speed as the pivot gear.

The gear mechanism provided in a front stage is supported rotatably on top of the carrier block, and includes an output gear that meshes with the driven gear of the input rotor and an intermediate gear that meshes with the output gear and an input gear of the rotary drive source. The intermediate gear is rotatably supported by a support shaft provided on and protruding from the carrier block. The gear mechanism in the front stage reduces the rotation to a reduction ratio corresponding to the ratio of the number of teeth between the output gear and input gear.

RELEVANT REFERENCES

List of Relevant Patent Literature

Patent Literature 1: Publication of Japanese Patent No. 5231530

SUMMARY

It is difficult to make the main speed reduction unit of the speed reducer thinner (reduce the size in the axial direction) because it contains the intricate main speed reduction mechanism thereinside. However, thinner main speed reduction units (having shorter axial lengths) of this type are desired for various applications.

In the speed reducer described in Patent Literature 1, the intermediate gear that is a part of the gear mechanism provided in a front stage is supported by the carrier block provided on the main speed reduction unit side. Therefore the carrier block needs to have an increased thickness (axial length) to accommodate the shaft that supports the intermediate gear in the carrier block. Therefore, it was difficult to realize the thinner main speed reducer unit in the speed reducer described in Patent Literature 1.

The present invention provides a reducer in which a thinner main speed reducer unit is provided, and a drive device using such speed reducer.

A speed reducer according to one aspect of the invention includes: a main speed reduction unit decelerating rotation from an input side and transmitting decelerated rotation to an output side; a fixed block coupled to the main speed reduction unit and rotatably supporting an input gear coupled to a rotary drive source; an output gear transmitting rotation of the input gear to an input side of the main speed reduction unit; and an intermediate gear meshing with the input gear and the output gear and rotatably supported by the fixed block.

In the above configuration, once the input gear is rotated by the power of the rotation drive source, the rotation is transmitted to the output gear via the intermediate gear supported on the fixed block side. The rotation transmitted to the output gear is inputted to an input section of the main speed reduction unit, then reduced by the main reduction unit, and outputted from an output section. In this configuration, the intermediate gear is supported on the fixed block side, not on the main speed reduction unit side. Therefore there is no need to increase the thickness of the main speed reduction unit to support the intermediate gear.

In the speed reducer, a recess may be formed in a surface of the fixed block facing the main speed reduction unit to accommodate the intermediate gear.

In this case, the intermediate gear is disposed in the recess formed in the fixed block so that there is no need to provide a deep recess in the main speed reduction unit to avoid interference with the intermediate gear. Consequently, the main speed reduction unit can be made thinner with this configuration.

The main speed reduction unit, includes: a first block coupled to the fixed block; an input rotor rotatably supported by the first block; a second block engaged with the first block such that the second block is rotatable relative to the first block; and a main speed reduction mechanism reducing and outputting rotation of the input rotor to the second block or the first block. One end of the output gear in an axial direction may be rotatably supported by the first block, and the other end of the output gear in the axial direction is rotatably supported by the fixed block.

Thus, the output gear is supported stably on both sides by the first block 15A of the main speed reduction unit and the fixed block. Therefore, it is possible to reduce the size of the bearing that supports the output gear rotatably in the main speed reduction unit. When this configuration is adopted, the main speed reduction unit can be made more thinner and smaller.

The main speed reduction unit, includes: a first block coupled to the fixed block; an input rotor rotatably supported by the first block; a second block engaged with the first block such that the second block is rotatable relative to the first block; and a main speed reduction mechanism reducing and outputting rotation of the input rotor to the second block or the first block. The output gear may be disposed concentrically with a center of relative rotation between the first block and the second block. The input rotor may have a driven gear that meshes with the output gear and, the input rotor is spaced away from the relative rotation center, and relative rotation between the fixed block and the first block around the relative rotation center is prevented by a restraining member.

In this case, when the rotation is transmitted to the input rotor through the driven gear, the restraining member is able to prevent the displacement of the first block relative to the fixed block due to a reaction force from the output side. Consequently, with this configuration, it is possible to suppress rattling and the like of the first block caused by the operation of the main speed reduction unit.

A speed reducer according to another aspect of the invention includes: a main speed reduction unit decelerating rotation from an input side and transmitting decelerated rotation to an output side; a fixed block coupled to the main speed reduction unit and rotatably supporting an input gear coupled to a rotary drive source; an output gear transmitting rotation of the input gear to an input side of the main speed reduction unit; and an intermediate gear meshing with the input gear and the output gear and rotatably supported by the fixed block. The main speed reduction unit, includes: a first block coupled to the fixed block; an input rotor rotatably supported by the first block; a second block engaged with the first block such that the second block is rotatable relative to the first block; and a main speed reduction mechanism outputting rotation of the input rotor to the second block or the first block. A main speed reduction mechanism outputting rotation of the input rotor to the second block or the first block, a main speed reduction mechanism outputting rotation of the input rotor to the second block or the first block, and the intermediate gear is rotatably supported by the fixed block in the recess.

A drive device according to another aspect of the invention includes: a speed reduction mechanism reducing rotation inputted by a rotary drive source and outputting decelerated rotation; and a rotary block coupled to an output of the speed reducer. The speed reducer includes: a main speed reduction unit decelerating rotation from an input side and transmitting decelerated rotation to an output side; a fixed block coupled to the main speed reduction unit and rotatably supporting an input gear coupled to a rotary drive source; a fixed block coupled to the main speed reduction unit and rotatably supporting an input gear coupled to a rotary drive source; and an intermediate gear meshing with the input gear and the output gear and rotatably supported by the fixed block.

Advantageous Effects

In the speed reducer and drive device described above, the main speed reduction gear unit can be made thinner since it is not necessary to increase the thickness on the main speed reduction unit side to support the intermediate gears.

DESCRIPTION OF THE EMBODIMENTS

Figure 1:
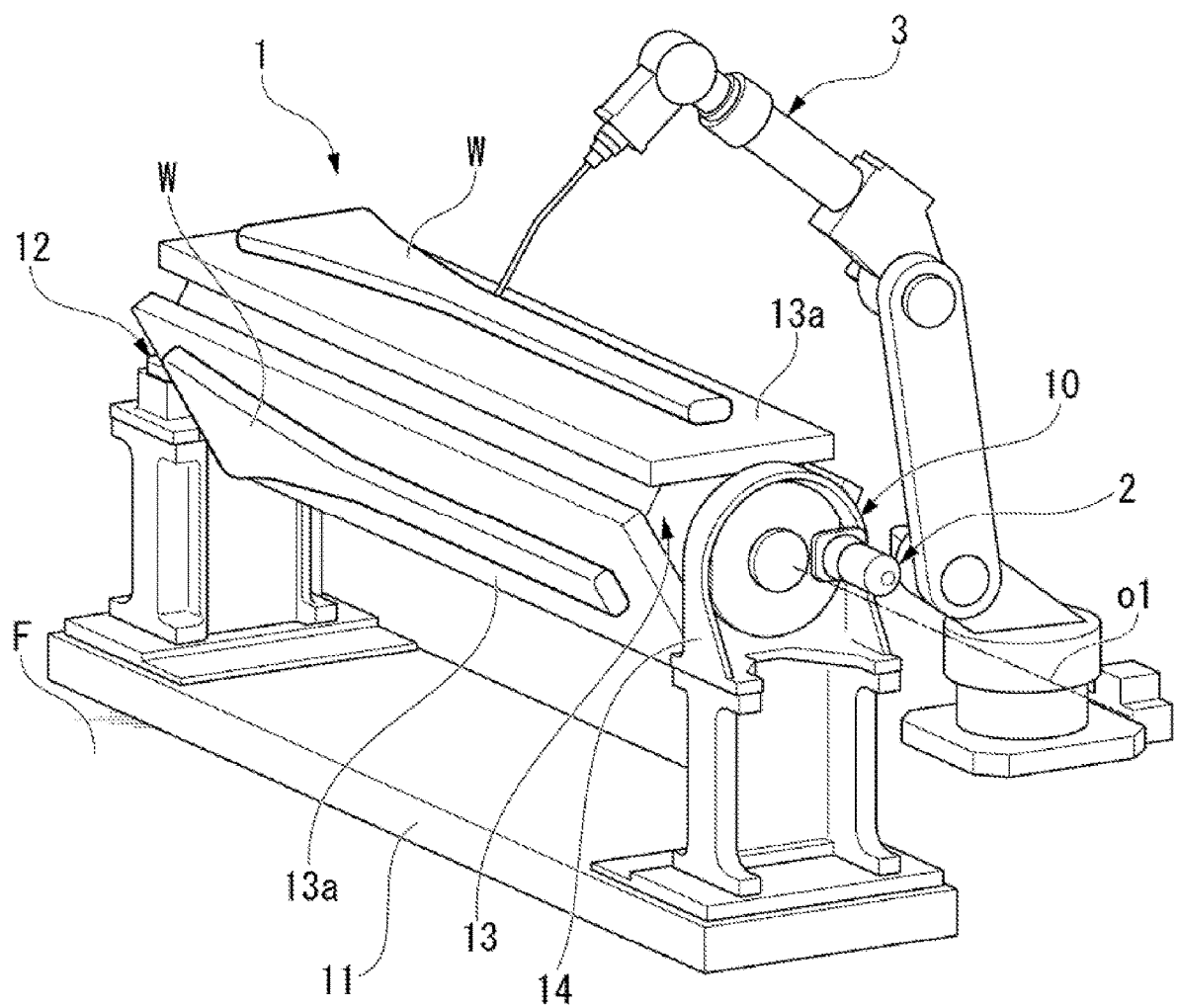
FIG. 1 is a perspective view of a drive device according to an embodiment of the invention.

The embodiments of the present invention will be hereinafter described with reference to the drawings. FIG. 1 is a perspective view of a drive device 1 used for welding and component assembly and the like. The drive device 1 includes: a base block 11 installed on a floor surface F; a speed reducer 10 fixedly installed on an upper surface of the base block 11 on one end side in the longitudinal direction of the base block 11; a motor 2 that is a rotary drive source driving the speed reducer 10; a retainer 12 fixedly installed on an upper surface of the base block 11 on the other end side thereof in the longitudinal direction; and a rotary block 13 supported at both end portions thereof in its longitudinal direction by the speed reducer 10 and the retainer 12. The motor 2 is integrally mounted to the input side of the speed reducer 10. The speed reducer 10 reduces rotation of the motor 2 and transmits the reduced rotation to one end of the rotary block 13 in the longitudinal direction. The retainer 12 rotatably supports the other end side of the rotary block 13 in the longitudinal direction. The rotary block 13 receives the power from the motor 2 via the speed reducer 10 and rotates about an axis (shaft center) o1 that extends substantially along the horizontal direction.

In this embodiment, the rotary block 13 has two or more work support surfaces 13a around the axis o1. A work W may be mounted on each work support surface 13a. The work W mounted on the work support surface 13a is moved toward a working position by the rotation of the rotary block 13 caused by the motor 2. At the working position, there may be installed a working device 3 such as a welding robot.

Figure 2:
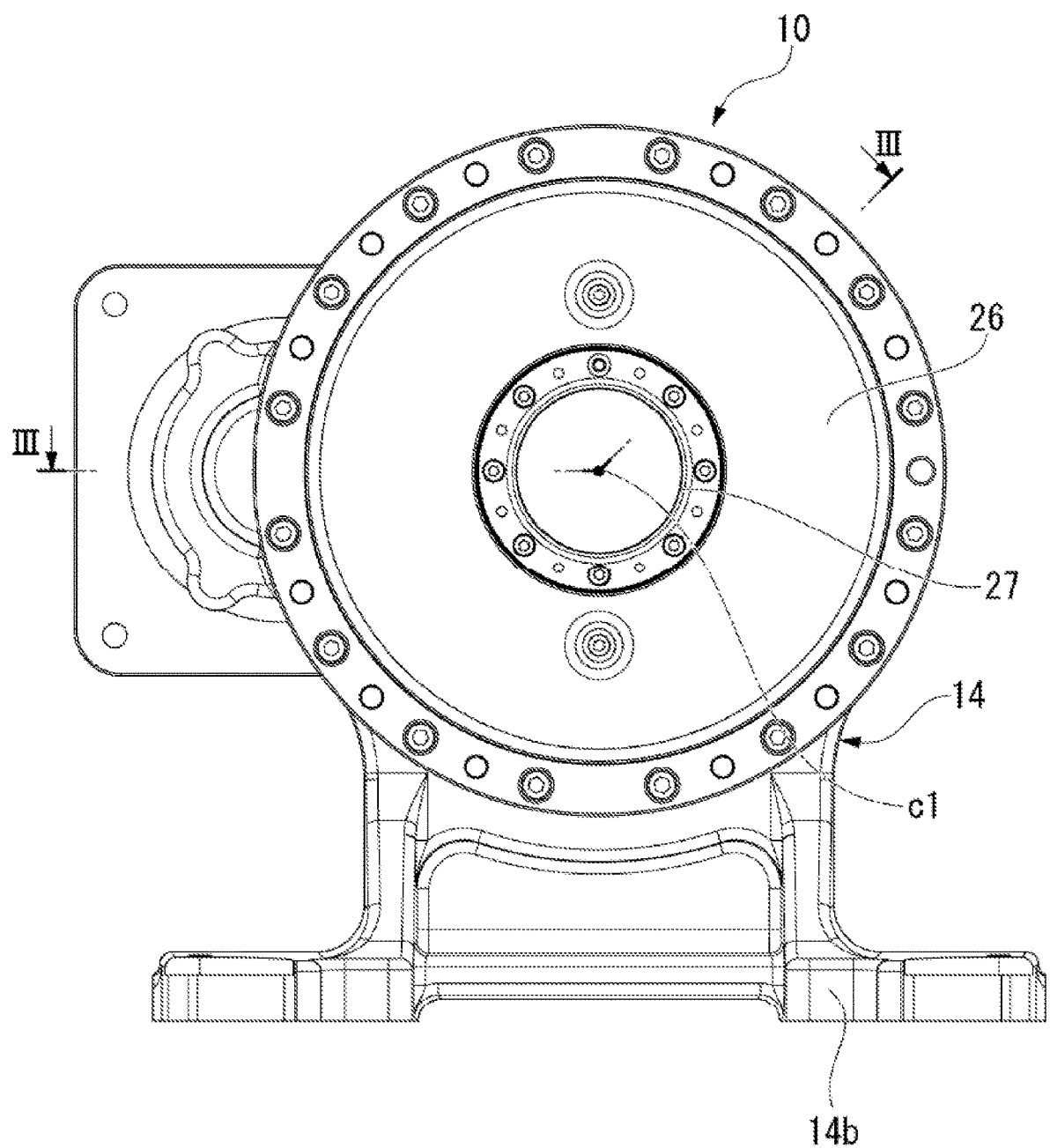
FIG. 2 is a front view of a speed reducer according to the embodiment.
Figure 3:
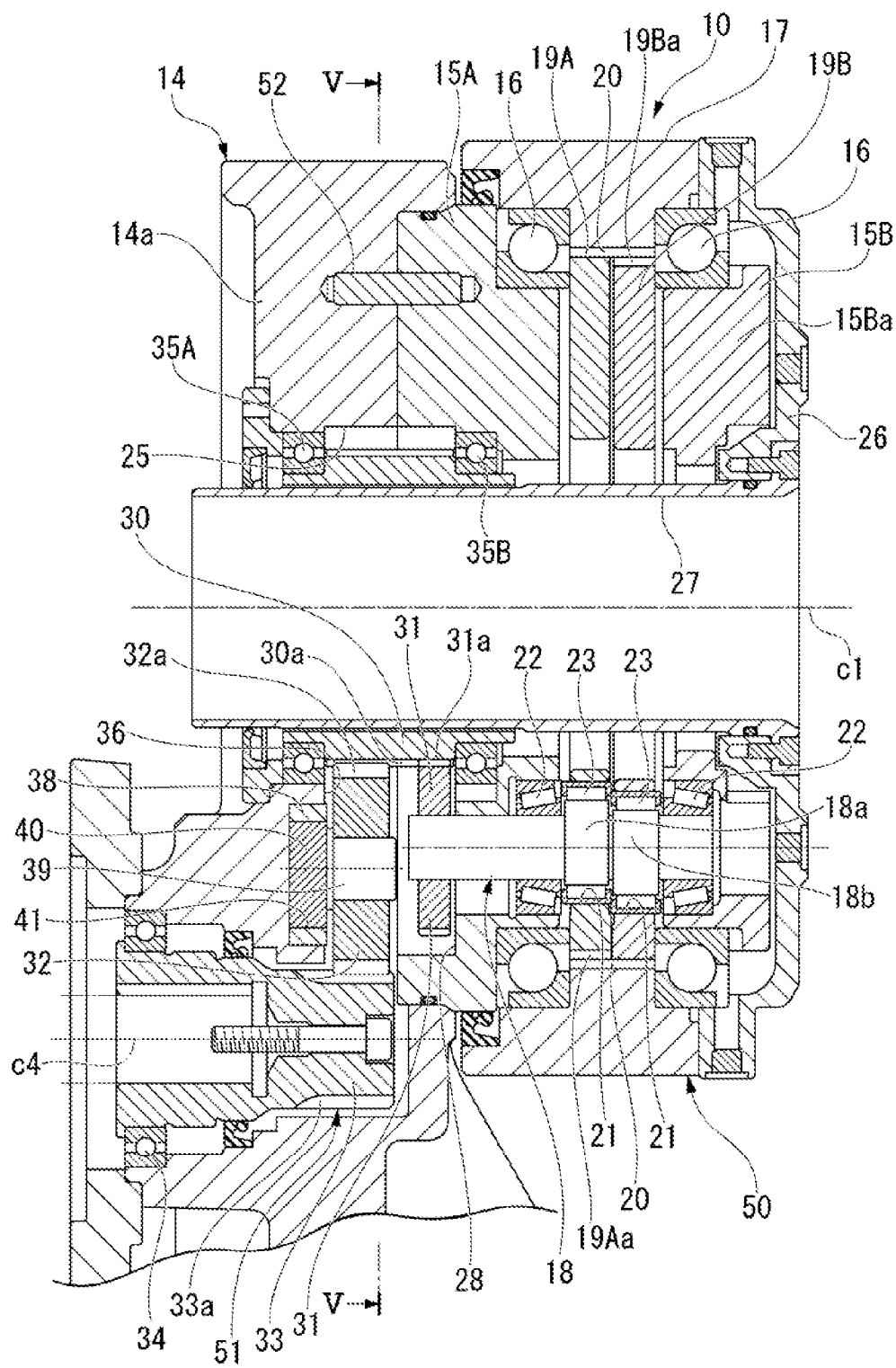
FIG. 3 is a sectional view along the line III-III in FIG. 2.
Figure 4:
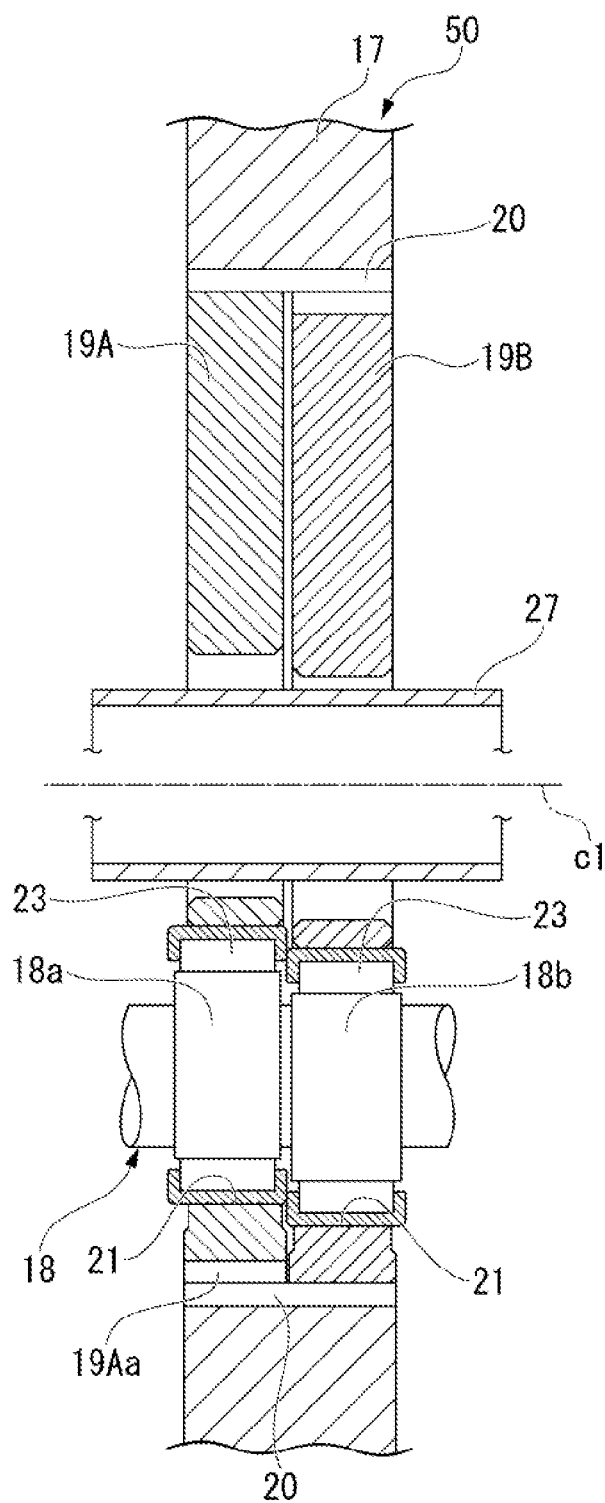
FIG. 4 is an enlarged sectional view of a part of the speed reducer according to the embodiment of FIG. 3.
Figure 5:
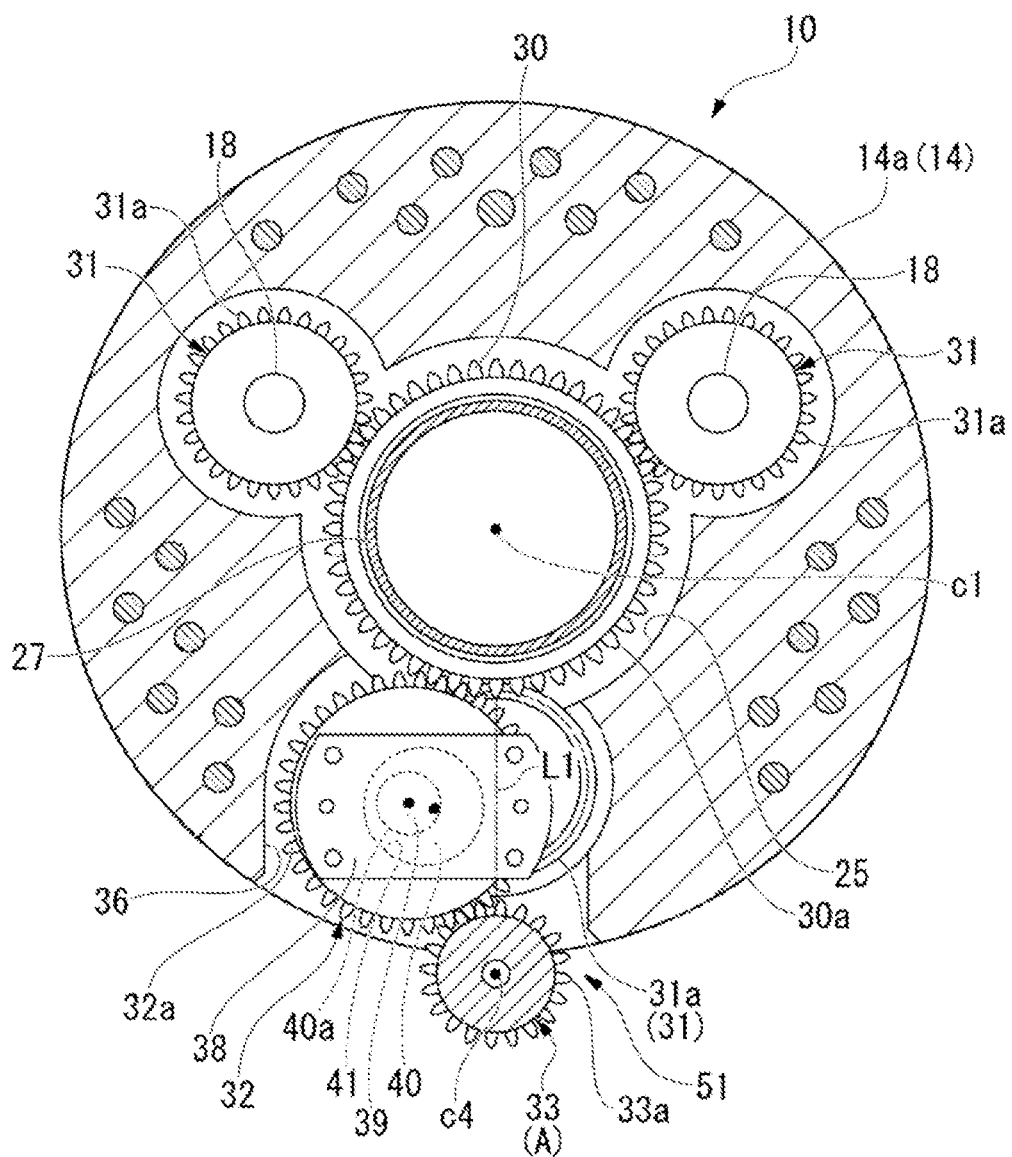
FIG. 5 is a sectional view of the speed reducer according to the embodiment along the line V-V in FIG. 3.

FIG. 2 is a front view of the speed reducer 10 viewed from the output side (the side where the rotary block 13 is attached), and FIG. 3 is a sectional view along the line III-III in FIG. 2. FIG. 4 is an enlarged sectional view of a part of the speed reducer 10 of FIG. 3, and FIG. 5 is a sectional view of the speed reducer 10 along the line V-V of FIG. 3. In FIG. 5, an output gear 30, crankshaft gear 31, intermediate gear 32 and the like, which will be described later, are not sectioned. In FIG. 5, a retainer 40 and an attachment base 38, which will be described later, are also shown. The speed reducer 10 includes a fixed block 14 whose lower end is fixedly installed on an upper surface of a base block 11 (see FIG. 1) at one end of the base block 11, a main speed reduction unit 50 coupled to the fixed block 14, and a gear mechanism 51 disposed between the main speed reduction unit 50 and the fixed block 14. The motor 2 is attached to the fixed block 14. The main speed reduction unit 50 decelerates the rotation input and transmits the decelerated rotation to the output side. In the speed reducer 10 of this embodiment, the gear mechanism 51 reduces the rotation outputted by the motor 2 in the front stage, and the reduced rotation output is further greatly reduced by the main speed reduction unit 50.

The fixed block 14 includes a disc-shaped base flange 14*a* with a circular through-hole 25 in the center (see FIG. 3), and a leg 14*b* (see FIG. 2) extending downward from the base flange 14*a*. The fixed block 14 is fixed to the base block 11 at a lower end of the leg 14*b* by a bolt or any other fastening means.

The main speed reduction unit 50 includes a first carrier block 15A and a second carrier block 15B coupled to the base flange 14*a* of the fixed block 14, an outer cylinder 17, a plurality (three) of crankshafts 18, and a first pivot gear 19A and a second pivot gear 19B. The outer cylinder 17 is rotatably supported via bearings 16 on the outer peripheral side of the first carrier block 15A and the second carrier block 15B. The plurality (three) of crankshafts (input rotors) 18 are rotatably supported by the first carrier block 15A and the second carrier block 15B. The first pivot gear 19A and the second pivot gear 19B pivot along with two eccentric portions 18*a*, 18*b* of each of the crankshafts 18, respectively. The speed reducer 10 is disposed on the base block 11 such that the rotational center axis c1 of its output is aligned with the axis o1 of the drive device 1.

The first carrier block 15A has a disk-like shape with a hole formed therein. The first carrier block 15A is overlaid on one end surface of the base flange 14*a* in the thickness direction and is integrally fixed to the base flange 14A by a bolt(s) or the like. The base flange 14*a* (fixed block 14) and the first carrier block 15A (first block) are stopped from turning (relative rotation) around the rotational center axis c1 by a positioning pin 52 (restraining member). The second carrier block 15B is fixed to the end surface of the first carrier block 15A facing away from the base flange 14*a* by a bolt(s) or the like. The second carrier block 15B includes a substrate portion 15Ba and a plurality of support columns (not shown). The substrate portion 15Ba has a disk-like shape with a hole formed therein, and the plurality of support columns extend from the end surface of the substrate portion 15Ba toward the first carrier block 15A. In the second carrier block 15B, the end surfaces of the support columns face the end surface of the first carrier block 15A, and the support columns are fixed to the first carrier block 15A. An axial gap is maintained between the first carrier block 15A and the substrate portion 15Ba of the second carrier block 15B. In this gap, there are disposed the first pivot gear 19A and the second pivot gear 19B. The first pivot gear 19A and the second pivot gear 19B have relief holes (not shown) penetrated by the support columns of the second carrier block 15B. The relief holes have sufficiently larger inner diameter than the support columns such that the support columns do not prevent the rotation of the first pivot gear 19A and the second pivot gear 19B.

The outer cylinder 17 extends from the outer peripheral surface of the first carrier block 15A and the outer peripheral surface of the substrate portion 15Ba of the second carrier block 15B. The axially opposite ends of the outer cylinder 17 are rotatably supported by the first carrier block 15A and the substrate portion 15Ba of the second carrier block 15B, respectively, via the bearings 16. In the inner peripheral surface of the axially middle region of the outer cylinder 17 (the region facing the outer peripheral surfaces of the first pivot gear 19A and the second pivot gear 19B), there are formed a plurality of pin grooves (not shown) extending in parallel with the rotational center axis c1. Each of the pin grooves receives an inner tooth pin 20 therein. The inner tooth pins 20 have a substantially cylindrical shape and are received in a rotatable manner. The plurality of inner tooth pins 20 attached to the inner peripheral surface of the outer cylinder 17 face the outer peripheral surfaces of the first pivot gear 19A and the second pivot gear 19B.

The first pivot gear 19A and the second pivot gear 19B have an outer diameter slightly smaller than the inner diameter of the outer cylinder 17. On the outer peripheral surfaces of the first pivot gear 19A and the second pivot gear 19B, there are formed outer teeth 19Aa, 19Ba, respectively, so as to contact in a meshing manner with the plurality of inner tooth pins 20 disposed on the inner peripheral surface of the outer cylinder 17. The respective numbers of the outer teeth 19Aa, 19Ba formed on the outer peripheral surfaces of the first pivot gear 19A and the second pivot gear 19B are slightly smaller than the number of the inner tooth pins 20 (by one, for example).

The plurality of crankshafts 18 are arranged in the same circumference centered at the rotational center axis c1 of the first carrier block 15A and the second carrier block 15B. Each of the crankshafts 18 is rotatably supported by the first carrier block 15A and the second carrier block 15B via the bearings 22. The eccentric portions 18*a*, 18*b* of each of the crankshafts 18 penetrate the first pivot gear 19A and the second pivot gear 19B, respectively. The eccentric portions 18*a*, 18*b* are rotatably engaged via eccentric portion bearings 23 with support holes 21 formed in the first pivot gear 19A and the second pivot gear 19B, respectively. The two eccentric portions 18*a*, 18*b* of each crankshaft 18 are positioned eccentrically so as to be out of phase with each other by 180° around the axis of the crankshaft 18.

When the plurality of crankshafts 18 receive an external force and rotate in one direction, the eccentric portions 18*a*, 18*b* of each crankshaft 18 rotate in the same direction at predetermined radii, such that the first pivot gear 19A and the second pivot gear 19B pivot in the same direction at the same radii. Simultaneously, the external teeth 19Aa, 19Ba of the first pivot gear 19A and the second pivot gear 19B contact in a meshing manner with the plurality of inner tooth pins 20 retained on the inner peripheral surface of the outer cylinder 17.

In the speed reducer 10 of the embodiment, the number of the inner tooth pins 20 retained on the outer cylinder 17 is slightly larger than the respective numbers of the external teeth 19Aa, 19Ba of the first pivot gear 19A and the second pivot gear 19B. Therefore the outer cylinder 17 is pushed and turns in the same direction as the rotating direction of the first and second pivot gears 19A and 19B by a predetermined pitch during a single rotation of the first and second pivot gears 19A and 19B. As a result, the rotations of the crankshafts 18 are largely reduced and then outputted as the rotation of the outer cylinder 17. In the embodiment, since the eccentric portions 18*a*, 18*b* of each crankshaft 18 are positioned eccentrically so as to be out of phase with each other by 180° around the axis, the first pivot gear 19A and the second pivot gear 19B rotate out of phase with each other by 180°.

On one axial end of the outer cylinder 17 opposite to the base flange 14*a*, there is attached an output plate 26 having a disk-like shape with a hole formed therein. The output plate 26 covers an end portion of the second carrier block 15B in a non-contact manner, and the rotary block 13 (see FIG. 1) for retaining a work can be attached to the axially outer end surface of the output plate by a bolt or any other means. A cylindrical portion 27 is attached to the inner periphery of the output plate 26. The cylindrical portion 27 penetrates the inside of the second carrier block 15B, the second pivot gear 19B, the first pivot gear 19A, the first carrier block 15A, and the base flange 14a in a non-contact manner. The cylindrical portion 27 rotates integrally with the output plate 26.

In this embodiment, the first carrier block 15A and the second carrier block 15B form the first block fixed to the fixed block 14, and the outer cylinder 17 forms the second block rotatably engaged relative to the first block. The rotational center of the first block, which are the first carrier block 15A and the second carrier block 15B, relative to the second block which is the outer cylinder 17, coincides with the rotational center axis o1 of the main speed reduction unit 50. The main speed reduction mechanism in the main speed reduction unit 50 includes the crankshaft 18, the first pivot gear 19A, the second pivot gear 19B, the internal tooth pins 20 on the inner circumference of the outer cylinder 17, and so on.

The gear mechanism 51 provided in the front stage includes an input gear 33 coupled to a rotation shaft (not shown) of the motor 2, the output gear 30 rotatably held on the inner peripheral of the first carrier block 15A and the base flange 14a, and an intermediate gear 32 meshing with the input gear 33 and the output gear 30 to transmit the rotation of the input gear 33 to the output gear 30. The output gear 30 is larger in diameter than the input gear 33 and has a larger number of teeth than the input gear 33. Therefore, the rotations of the input gear 33 driven by the motor 2 are reduced to a predetermined reduction ratio at the output gear 30.

The input gear 33 is rotatably supported via a bearing 34 on the edge of the base flange 14a that is spaced away from the through hole 25 in the radially outward direction. The axis (axial center) c4 of the input gear 33 is disposed parallel to the rotational center axis c1 of the output side of the speed reducer 10.

The output gear 30 is formed such that it spans the axial length of the first carrier block 15A and the base flange 14a. External teeth 30a are formed in a middle region of the output gear 30 in the axial direction. One end of the output gear 30 in the axial direction is rotatably held on the inner peripheral surface of the first carrier block 15A via a bearing 35B. The other end of the output gear 30 in the axial direction is rotatably held on the inner peripheral surface of the through hole 25 of the base flange 14a via a bearing 35A. The output gear 30 rotates on the rotational center axis c1 at the end of the first carrier block 15A on the fixed block 14 side.

A plurality (three) of recesses 28 are formed in an end portion of the first carrier block 15A situated closer to the base flange 14a such that they correspond to the positions of the aforementioned two or more (three in this embodiment) of crankshafts 18. Each recess 28 opens in the inner peripheral surface of the first carrier block 15A. A crankshaft gear 31 (driven gear) is attached to an end of each crankshaft 18 on the base flange 14a side to transmit its rotation to the crankshaft 18. In this embodiment, the crankshaft 18 and the crankshaft gear 31 form the input rotor of the main speed reduction unit 50.

The crankshaft gear 31 attached to each crankshaft 18 is disposed in the corresponding recess 28. Each crankshaft gear 31 has external teeth 31a. The external teeth 31a of each crankshaft gear 31 mesh with the external teeth 30a of the output gear 30 in a region near one end in the axial direction. Therefore, the rotation inputted from the input gear 33 to the output gear 30 via the intermediate gear 32 is transmitted to each crankshaft 18 through the crankshaft gear 31.

A recess 36 is formed in an end surface of the base flange 14a on the first carrier block 15 side to accommodate the external teeth 33A of the input gear 33 and external teeth 32A of the intermediate gear 32. A mounting base 38 for supporting the intermediate gear 32 is attached to a bottom surface of the recess 36 of the base flange 14a (the surface facing the end surface of the first carrier block 15A). A part of the recess 36 is open to the central through-hole 25 of the base flange 14a. The intermediate gear 32 disposed in the recess 36 meshes with the outer teeth 30a of the output gear 30 in an open space of the recess 36 on the radially inner side.

The intermediate gear 32 is rotatably supported by a cylindrical support shaft 39. The support shaft 39 is integrally formed with a cylindrical retaining member 40, which has a larger outer diameter and shorter axial length than the support shaft 39. The mounting base 38 has a circular retaining hole 41 in which an outer peripheral surface of the retaining member 40 is fitted and fixed. The support shaft 39 is fixed in the recess 36 of the base flange 14a (fixed block 14) by fitting the retaining member 40 into the retaining hole 41.

As described above, in the speed reducer 10 of this embodiment, the intermediate gear 32, which transmits rotation from the input gear 33 to the output gear 30, is rotatably supported on the fixed block 14 side, not on the main speed reduction unit 50 side. Therefore, there is no need to increase the thickness of the main speed reduction unit 50 to support the support shaft 39 of the intermediate gear 32. Accordingly, when the speed reducer 10 of this embodiment is adopted, the main speed reduction unit 50 can be made thinner (the size in the axial direction can be reduced).

In addition, the speed reducer 10 of this embodiment has the recess 36 for accommodating the intermediate gear 32 in the surface of the fixed block 14 facing the main speed reduction unit 50. Therefore, there is no need to provide a deep recess in the surface of the main speed reduction unit 50 facing the fixed block 14 to avoid interference with the intermediate gear 32. The main speed reduction unit 50 can be made thinner with this configuration.

The main speed reduction unit 50 of the speed reducer 10 includes the first carrier block 15A and the second carrier block 15B coupled to the fixed block 14, the outer cylinder 17 that is rotatably engaged with the first and second carrier blocks 15A and 15B, and the main speed reduction mechanism that reduces the rotation of the crankshafts 18 and outputs it to the outer cylinder 17. The output gear 30 of the gear mechanism 51 in the front stage is rotatably supported at one end in the axial direction by the first carrier block 15A, and rotatably supported at the other end in the axial direction by the base flange 14a of the fixed block 14. Thus, the output gear 30, which has a long axial length, is supported stably on both sides by the first carrier block 15A and the fixed block 14. Therefore, the speed reducer 10 having such a configuration can reduce the size of the bearing 35B that supports the output gear 30 in the main speed reduction unit 50. When this configuration is adopted, the main speed reduction unit 50 can be made more thinner and smaller.

Furthermore, in the speed reducer 10 of the embodiment, the output gear 30 of the gear mechanism 51 is arranged concentrically with the rotational center axis c1 of the main speed reduction unit 50, and the crankshaft gear 31 that meshes with the output gear 30 and the crankshaft 18 on the main speed reduction unit 50 side are arranged spaced away from the rotational center axis c1. The relative rotation of the first carrier block 15A coupled to the fixed block 14 around the rotational center axis c1 is prevented (relative rotation is restricted) by the positioning pin 52. Therefore, when the rotation of the output gear 30 is transmitted to the crankshafts 18 through the crankshaft gears 31, the positioning pin 52 is able to prevent the displacement of the first carrier block 15A relative to the fixed block 14 due to a large reaction force from the output side. Consequently, with this configuration, it is possible to suppress rattling and the like of the first carrier block 15A caused by the operation of the main speed reduction unit 50.

The present invention is not limited to the above-described embodiments but is susceptible of various design modification within the purport of the present invention. For example, in the above embodiment, the recess 36 is provided in the fixed block 14 and the intermediate gear 32 is housed inside the recess 36. Alternatively, a notch or step may be provided in the fixed block 14 to dispose the intermediate gear 32 in the notch or step, and the notch or step may be covered by a lid or the like.

In the above embodiment, the outer cylinder 17, which is the second block, is configured as the output rotor that rotates by the power of the motor 2. Alternatively, the outer cylinder 17, which is the second block, may be fixed and installed outside, and the first carrier block 15A and the second carrier block 15B, which are the first block, may serve as the output rotor. In this case, the rotary block that holds a workpiece or the like is coupled to the first carrier block 15A or the second carrier block 15B. The fixed block 14 and the motor 2 rotate together with the first carrier block 15A and the second carrier block 15B.

Further, in the above embodiment, the main speed reduction mechanism in the main speed reduction unit 50 includes the crankshaft 18, the first pivot gear 19A, the second pivot gear 19B, the internal tooth pins 20 on the outer cylinder 17. However, the main speed reduction mechanism is not limited to this configuration. The main speed reduction mechanism may have any other configuration, such as a planetary gear mechanism, for example.

LIST OF REFERENCE NUMBERS

1 . . . drive device, 2 . . . motor (rotary drive source), 10 . . . speed reducer, 13 . . . rotary block, 14 . . . fixed block, 15A . . . first carrier block (first block), 15B . . . second carrier block (second block), 17 . . . outer cylinder (second block), 18 . . . crankshaft (input rotor, main speed reduction mechanism), 19A . . . first pivot gear (main speed reduction mechanism), 19B . . . second pivot gear (main reduction mechanism), 20 . . . internal tooth pins (main speed reduction mechanism), 30 . . . output gear, 31 . . . crankshaft gear (driven gear, input rotor), 32 . . . intermediate gear, 33 . . . input gear, 36 . . . recess, 50 . . . main speed reduction unit, 51 . . . gear mechanism, 52 . . . positioning pin (restraining member)

What is claimed is:
1. A speed reducer, comprising:
a main speed reduction unit configured to decelerate rotation from an input side and to transmit decelerated rotation to an output side;
a fixed block coupled to the main speed reduction unit and configured to rotatably support an input gear coupled to a rotary drive source;
an output gear configured to transmit rotation of the input gear to the input side of the main speed reduction unit; and
an intermediate gear configured to mesh with the input gear and the output gear and rotatably supported by the fixed block,
wherein an axis center of the input gear is disposed parallel to a rotational center axis of the main speed reduction unit,
wherein the main speed reduction unit includes:
a first block coupled to the fixed block;
an input rotor rotatably supported by the first block;
a second block engaged with the first block such that the second block is rotatable relative to the first block; and
a main speed reduction mechanism configured to output rotation of the input rotor to the second block or the first block,
wherein one end of the output gear in an axial direction is rotatably supported by the first block, and the other end of the output gear in the axial direction is rotatably supported by the fixed block,
wherein the intermediate gear is rotatably supported by a support shaft fixed to the fixed block,
wherein a recess is formed in a surface of the fixed block facing the main speed reduction unit to accommodate the intermediate gear,
wherein the support shaft is fixed in the recess,
wherein the input rotor has a driven gear that meshes with the output gear, and the input rotor is spaced away from the relative rotation center,
wherein relative rotation between the fixed block and the first block around the relative rotation center is prevented by a restraining member,
wherein external teeth of the driven gear mesh with external teeth of the output gear,
wherein external teeth of the intermediate gear mesh with the external teeth of the output gear, and
wherein the external teeth of the output gear linearly extend along the rotational center axis.
2. A drive device, comprising:
a speed reducer of claim 1 configured to decelerate rotation inputted by the rotary drive source and to output decelerated rotation; and
a rotary block coupled to an output of the speed reducer.
3. The speed reducer of claim 1, wherein the one end of the output gear in the axial direction is rotatably supported by the first block via a first bearing, and
wherein the other end of the output gear in the axial direction is rotatably supported by the fixed block via a second bearing.
4. The speed reducer of claim 1, wherein all of the external teeth of the output gear extend from the same plane of the output gear that is parallel to the rotational center axis.
5. The speed reducer of claim 1, wherein all of the external teeth of the output gear extend from the same surface of the output gear that is parallel to the rotational center axis.
6. The speed reducer of claim 5, wherein the surface of the output gear is a peripheral surface of the output gear.
7. A speed reducer, comprising:
a main speed reduction unit configured to decelerate rotation from an input side and to transmit decelerated rotation to an output side;
a fixed block coupled to the main speed reduction unit and configured to rotatably support an input gear coupled to a rotary drive source;

an output gear configured to transmit rotation of the input gear to the input side of the main speed reduction unit; and an intermediate gear configured to mesh with the input gear and the output gear and rotatably supported by the fixed block, wherein the main speed reduction unit includes:

a first block coupled to the fixed block;

an input rotor rotatably supported by the first block;

a second block engaged with the first block such that it is rotatable relative to the first block; and a main speed reduction mechanism outputting rotation of the input rotor to the second block or the first block, wherein the output gear is rotatably supported at an end portion of the first block on the fixed block side at a position concentric to a center of relative rotation between the first block and the second block, wherein a recess is formed in a surface of the fixed block facing the main speed reduction unit to accommodate the intermediate gear, wherein the intermediate gear is rotatably supported by the fixed block in the recess, and wherein an axis center of the input gear is disposed parallel to a rotational center axis of the main speed reduction unit, wherein the intermediate gear is rotatably supported by a support shaft fixed in the recess, wherein the input rotor has a driven gear that meshes with the output gear, and the input rotor is spaced away from the relative rotation center, wherein relative rotation between the fixed block and the first block around the relative rotation center is prevented by a restraining member, wherein external teeth of the driven gear mesh with external teeth of the output gear, wherein external teeth of the intermediate gear mesh with the external teeth of the output gear, and wherein the external teeth of the output gear linearly extend along the rotational center axis.

8. A drive device, comprising:

a speed reducer of claim 7 configured to decelerate rotation inputted by the rotary drive source and to output decelerated rotation; and a rotary block coupled to an output of the speed reducer.

9. The speed reducer of claim 7, wherein the output gear is rotatably supported at the end portion of the first block on the fixed block side via a first bearing.

10. The speed reducer of claim 7, wherein all of the external teeth of the output gear extend from the same plane of the output gear that is parallel to the rotational center axis.

11. The speed reducer of claim 7, wherein all of the external teeth of the output gear extend from the same surface of the output gear that is parallel to the rotational center axis.

12. The speed reducer of claim 11, wherein the surface of the output gear is a peripheral surface of the output gear.

* * * * *